(12) United States Patent
Takagi et al.

(10) Patent No.: US 9,270,187 B2
(45) Date of Patent: Feb. 23, 2016

(54) ELECTRIC POWER CONVERSION SYSTEM

(71) Applicants: Kenichi Takagi, Nagoya (JP); Masanori Ishigaki, Nagakute (JP); Takaji Umeno, Nisshin (JP); Takahiro Hirano, Toyota (JP); Jun Muto, Toyota (JP); Yasuharu Terada, Toyota (JP); Kenichiro Nagashita, Toyota (JP)

(72) Inventors: Kenichi Takagi, Nagoya (JP); Masanori Ishigaki, Nagakute (JP); Takaji Umeno, Nisshin (JP); Takahiro Hirano, Toyota (JP); Jun Muto, Toyota (JP); Yasuharu Terada, Toyota (JP); Kenichiro Nagashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/218,361

(22) Filed: Mar. 18, 2014

(65) Prior Publication Data

US 2014/0286055 A1    Sep. 25, 2014

(30) Foreign Application Priority Data

Mar. 21, 2013  (JP) ................................. 2013-058908

(51) Int. Cl.
*H02M 3/335*    (2006.01)
*H02M 1/38*    (2007.01)
*H02M 1/00*    (2007.01)

(52) U.S. Cl.
CPC ........ *H02M 3/3353* (2013.01); *H02M 3/33584* (2013.01); *H02M 1/38* (2013.01); *H02M 2001/0016* (2013.01)

(58) Field of Classification Search
USPC .................................... 363/15–17, 21.02, 98
See application file for complete search history.

(56) References Cited

U.S. PATENT DOCUMENTS

| | | | |
|---|---|---|---|
| 7,408,794 B2 | 8/2008 | Su | |
| 2006/0139823 A1 | 6/2006 | Shoji et al. | |
| 2011/0198933 A1 | 8/2011 | Ishigaki et al. | |
| 2011/0249472 A1* | 10/2011 | Jain et al. | ........................ 363/15 |
| 2012/0020126 A1 | 1/2012 | Moki | |

FOREIGN PATENT DOCUMENTS

| | | |
|---|---|---|
| JP | 2006-187147 A | 7/2006 |
| JP | 2010-057242 A | 3/2010 |
| JP | 2011-193713 A | 9/2011 |
| WO | 2010-114088 A1 | 10/2010 |

* cited by examiner

*Primary Examiner* — Nguyen Tran
(74) *Attorney, Agent, or Firm* — Dinsmore & Shohl LLP

(57) ABSTRACT

An electric power conversion system includes: a primary electric power conversion circuit including a primary coil connected to a connection point between a plurality of transistors; a secondary electric power conversion circuit configured similarly to the primary electric power conversion circuit and including a secondary coil corresponding to the primary coil; and a control circuit controlling transfer of electric power between the primary and secondary electric power conversion circuits. The control circuit executes feedforward control for setting one of an on/off ratio of a terminal voltage signal of the primary coil and an on/off ratio of a terminal voltage signal of the secondary coil, in response to at least one of fluctuations in voltage ratio between both waveforms and fluctuations in phase symmetry between both waveforms, when the terminal voltage waveform of the primary coil and the terminal voltage waveform of the secondary coil are different from each other.

6 Claims, 7 Drawing Sheets

WITHOUT FEEDFORWARD CONTROL

WITH FEEDFORWARD CONTROL

WITHOUT FEEDFORWARD CONTROL

WITH FEEDFORWARD CONTROL

WITHOUT FEEDFORWARD CONTROL

WITH FEEDFORWARD CONTROL

ELECTRIC POWER CONVERSION SYSTEM

INCORPORATION BY REFERENCE

The disclosure of Japanese Patent Application No. 2013-058908 filed on Mar. 21, 2013 including the specification, drawings and abstract is incorporated herein by reference in its entirety.

BACKGROUND OF THE INVENTION

1. Field of the Invention

The invention relates to an electric power conversion system and, more particularly, to an electric power conversion system that includes a primary electric power conversion circuit and a secondary electric power conversion circuit magnetically coupled to the primary electric power conversion circuit.

2. Description of Related Art

There has been developed an electric power conversion system that bidirectionally exchanges electric power between a primary electric power conversion circuit and a secondary electric power conversion circuit magnetically coupled to the primary electric power conversion circuit. Each of the primary electric power conversion circuit and the secondary electric power conversion circuit is configured to include a plurality of transistors that are serially connected to each other between a positive electrode bus and a negative electrode bus. In each of the primary electric power conversion circuit and the secondary electric power conversion circuit, a dead time during which both the serially connected transistors are turned off is provided in order to prevent a short circuit between the plurality of serially connected transistors.

As a related technique of the invention, for example, U.S. Pat. No. 7,408,794 describes an electric power conversion circuit that includes three input/output ports and half-bridge circuits. There is also disclosed that a high-voltage inverter circuit, a 14V load and a 42V load are respectively connected to the three input/output ports of the electric power conversion circuit.

Japanese Patent Application Publication No. 2006-187147 (JP 2006-187147 A) describes an electric power conversion circuit that includes two input/output ports and full-bridge circuits. The electric power conversion circuit includes three reactors in addition to reactors that constitute a transformer. There is also disclosed that a high-voltage inverter circuit and a low-voltage electronic device are respectively connected to the two input/output ports of the electric power conversion circuit.

In the above electric power conversion system, a power transfer direction and a power transfer amount are controlled by equalizing the terminal voltage waveform of a primary coil of the primary electric power conversion circuit to the terminal voltage waveform of a secondary coil of the secondary electric power conversion circuit and then adjusting a phase difference $\phi$ between the two voltage waveforms.

When a dead time is provided as described above, the phase symmetry between the terminal voltage waveform of the primary coil of the primary electric power conversion circuit and the terminal voltage waveform of the secondary coil of the secondary electric power conversion circuit may fluctuate.

Due to fluctuations in voltage of a power supply connected to the primary electric power conversion circuit or secondary electric power conversion circuit, the voltage ratio between the terminal voltage waveform of the primary coil and the terminal voltage waveform of the secondary coil may fluctuate. In this way, when there occur the above-described phase symmetry fluctuations or voltage ratio fluctuations, circulating current that does not contribute to transfer of electric power flows in the primary electric power conversion circuit and the secondary electric power conversion circuit.

SUMMARY OF THE INVENTION

The invention provides an electric power conversion system that controls circulating current.

An aspect of the invention provides an electric power conversion system. The electric power conversion system includes: a primary electric power conversion circuit including a plurality of serially connected transistors and a primary coil connected to a connection point between the plurality of transistors, between a positive electrode bus and a negative electrode bus; a secondary electric power conversion circuit configured similarly to the primary electric power conversion circuit and including a secondary coil corresponding to the primary coil; and a control circuit configured to control transfer of electric power between the primary electric power conversion circuit and the secondary electric power conversion circuit by magnetically coupling the primary coil to the secondary coil, wherein the control circuit is configured to execute feedforward control for setting one of an on/off ratio of a terminal voltage signal of the primary coil and an on/off ratio of a terminal voltage signal of the secondary coil in response to at least one of fluctuations in voltage ratio between a terminal voltage waveform of the primary coil and a terminal voltage waveform of the secondary coil and fluctuations in phase symmetry between the terminal voltage waveform of the primary coil and the terminal voltage waveform of the secondary coil when the terminal voltage waveform of the primary coil and the terminal voltage waveform of the secondary coil are different from each other.

According to the aspect of the invention, when the terminal voltage waveform of the primary coil and the terminal voltage waveform of the secondary coil are different from each other, feedforward control for setting one of the on/off ratio of the terminal voltage signal of the primary coil and the on/off ratio of the terminal voltage signal of the secondary coil is executed in response to at least one of fluctuations in voltage ratio between the terminal voltage waveform of the primary coil and the terminal voltage waveform of the secondary coil and fluctuations in phase symmetry between the terminal voltage waveform of the primary coil and the terminal voltage waveform of the secondary coil. Thus, it is possible to suppress circulating current because the correlation between the terminal voltage waveform of the primary coil and the terminal voltage waveform of the secondary coil is corrected.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
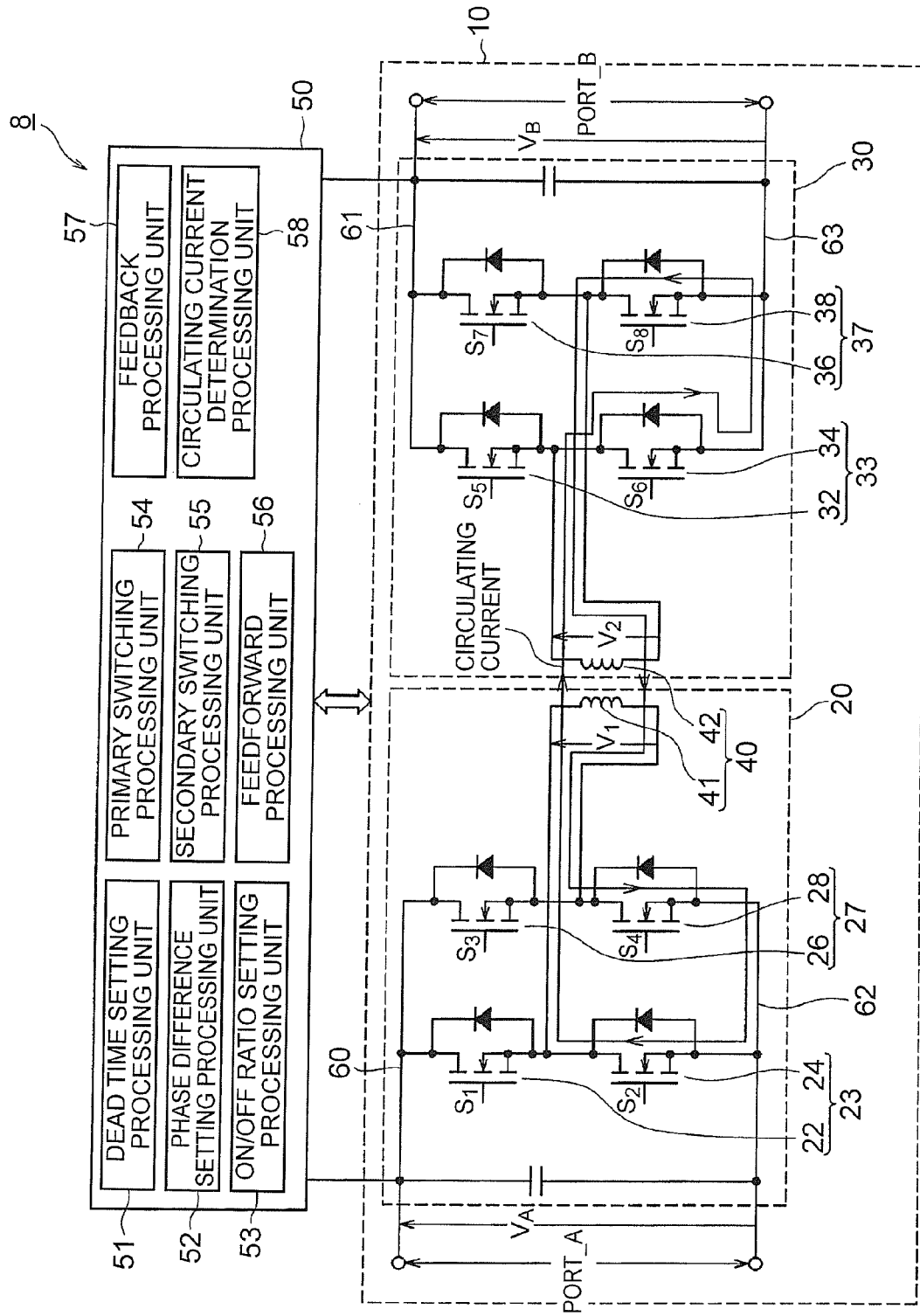
FIG. 1 is a view that shows an electric power conversion system according to an embodiment of the invention.

Hereinafter, an embodiment of the invention will be described with reference to the accompanying drawings. Like reference numerals denote similar elements in all the drawings, and the overlap description is omitted.

FIG. 1 is a view that shows an electric power conversion system 8. The electric power conversion system 8 is configured to include an electric power conversion device 10 and a control circuit 50. The electric power conversion device 10 has the function of transferring electric power between input/output ports A, B. The electric power conversion device 10 is configured to include a primary electric power conversion circuit 20 and a secondary electric power conversion circuit 30. The primary electric power conversion circuit 20 and the secondary electric power conversion circuit 30 are magnetically coupled to each other by a transformation circuit 40.

A primary left arm 23 is connected between a primary positive electrode bus 60 and a primary negative electrode bus 62. The primary left arm 23 is formed by serially connecting a primary left arm upper transistor 22 and a primary left arm lower transistor 24. A primary right arm 27 is connected in parallel with the primary left arm 23 between the primary positive electrode bus 60 and the primary negative electrode bus 62. The primary right arm 27 is formed by serially connecting a primary right arm upper transistor 26 and a primary right arm lower transistor 28.

The input/output port A (PORT_A) is provided between the primary positive electrode bus 60 and the primary negative electrode bus 62. The secondary electric power conversion circuit 30 is a circuit having a similar configuration to the primary electric power conversion circuit 20. A secondary left arm 33 is connected between a secondary positive electrode bus 61 and a secondary electrode bus 63. The secondary left arm 33 is formed by serially connecting a secondary left arm upper transistor 32 and a secondary left arm lower transistor 44. A secondary right arm 37 is connected in parallel with the secondary left arm 33 between the secondary positive electrode bus 61 and the secondary negative electrode bus 63. The secondary right arm 27 is formed by serially connecting a secondary right arm upper transistor 36 and a secondary right arm lower transistor 38. The input/output port B (PORT_B) is provided between the secondary positive electrode bus 61 and the secondary negative electrode bus 63. A load, a power supply, and the like, are connected to the input/output ports A, B.

The transformation circuit 40 includes a primary coil 41 and a secondary coil 42 magnetically coupled to the primary coil 41. The winding number ratio between the primary coil 41 and the secondary coil 42 is 1:N.

The control circuit 50 has the function of setting parameters for controlling the overall electric power conversion device 10 and executing switching control over transistors of the primary electric power conversion circuit 20 and secondary electric power conversion circuit 30. The control circuit 50 is configured to include a dead time setting processing unit 51, a phase difference setting processing unit 52, an on/off ratio setting processing unit 53, a primary switching processing unit 54, a secondary switching processing unit 55, a feedforward processing unit 56, a feedback processing unit 57 and a circulating current determination processing unit 58. The above functions may be implemented by executing software, and, specifically, may be implemented by executing a circulating current suppressing program. Part of these functions may be implemented by hardware.

The dead time setting processing unit 51 has the function of setting a dead time converted value $\xi$. Here, the dead time converted value $\xi$ is a value that is obtained by $Td/To \times 2\pi$ (To: switching period) when a dead time Td that is a period during which both one of the upper arm-side transistors 22, 26, 32, 36 and a corresponding one of the lower arm-side transistors 24, 28, 34, 38 are in an off state. Here, the initial value of the dead time Td is obtained in advance through an experiment, simulation, or the like.

The phase difference setting processing unit 52 has the function of setting a phase difference $\phi$ in the period of switching control over the transistors between the primary electric power conversion circuit 20 and the secondary electric power conversion circuit 30. The phase difference $\phi$ is a phase difference in voltage waveform between the terminal voltage V1 of the primary coil 41 and the terminal voltage V2 of the secondary coil 42. Here, by changing the phase difference $\phi$, it is possible to control the direction and amount of electric power transferred between the primary electric power conversion circuit 20 and the secondary electric power conversion circuit 30. It is possible to transfer electric power from the primary electric power conversion circuit 20 to the secondary electric power conversion circuit 30 when phase difference $\phi \geq +|$dead time converted value $\xi|$; whereas it is possible to transfer electric power from the secondary electric power conversion circuit 30 to the primary electric power conversion circuit 20 when phase difference $\phi \leq -|$dead time converted value $\xi|$. When $-|$dead time converted value$|$ $\xi|<$phase difference $\phi<+|$dead time converted value $\xi|$, that is, when $|$phase difference $\phi|<|$dead time converted value $\xi|$, no electric power is transferred between the primary electric power conversion circuit 20 and the secondary electric power conversion circuit 30.

The on/off ratio setting processing unit 53 has the function of setting the on/off ratio of each of the transistors of the primary electric power conversion circuit 20 and secondary electric power conversion circuit 30 in order to adjust the amount of electric power transferred between the primary electric power conversion circuit 20 and the secondary electric power conversion circuit 30. Here, the on/off ratio in switching control over each of the left arm lower transistor 24 and right arm lower transistor 28 of the primary electric power conversion circuit 20 is set to D1 ($\delta 1/2\pi$), and the on/off ratio in switching control over each of the left arm lower transistor 34 and right arm lower transistor 38 of the secondary electric power conversion circuit 30 is set to D2 ($\delta 2/2\pi$).

The primary switching processing unit 54 has the function of controlling the transistors, that is, the left arm upper transistor 22, the left arm lower transistor 24, the right arm upper transistor 26 and the right arm lower transistor 28, on the basis of settings made by the dead time setting processing unit 51, the phase difference setting processing unit 52 and the on/off ratio setting processing unit 53.

The secondary switching processing unit 55, as well as the primary switching processing unit 54, has the function of executing switching control over the transistors, that is, the left arm upper transistor 32, the left arm lower transistor 34, the right arm upper transistor 36 and the right arm lower transistor 38.

The feedforward processing unit 56 executes feedforward control for setting one of the on/off ratio of the terminal voltage V1 of the primary coil 41 and the on/off ratio of the terminal voltage V2 of the secondary coil 42 in response to fluctuations in phase symmetry between both waveforms when the waveform of the terminal voltage V1 of the primary coil 41 and the waveform of the terminal voltage V2 of the secondary coil 42 are different from each other due to the set dead time Td. Electric power is transferred between the primary electric power conversion circuit 20 and the secondary electric power conversion circuit 30 when |phase difference $\phi$|≥|dead time converted value $\xi$|, and the feedforward processing unit 56 executes feedforward control such that the on/off ratio of each of the transistors of a power transmitting one of the primary electric power conversion circuit 20 and the secondary electric power conversion circuit 30 is smaller than the on/off ratio of each of the transistors of a power receiving one of the primary electric power conversion circuit 20 and the secondary electric power conversion circuit 30. Specifically, for example, when electric power is transferred from the secondary electric power conversion circuit 30 to the primary electric power conversion circuit 20, the secondary electric power conversion circuit 30 is the power transmitting one, and the primary electric power conversion circuit 20 is the power receiving one. At this time, by using the relational expression $D2=D1-\xi/2\pi$, the on/off ratio D2 of each of the left arm upper transistor 32, left arm lower transistor 34, right arm upper transistor 36 and right arm lower transistor 38 of the secondary electric power conversion circuit 30 is reset. When the primary electric power conversion circuit 20 is the power transmitting one, and the secondary electric power conversion circuit 30 is the power receiving one, the relational expression $D1=D2-\xi/2\pi$ is used. The feedforward processing unit 56 does not execute the feedforward control when |phase difference $\phi$|<|dead time converted value $\xi$|.

The feedback processing unit 57 executes feedback control (PI control) for resetting the on/off ratio of each of the transistors of the power transmitting conversion circuit such that a circulating current is 0 when there is the circulating current (described later) even after feedforward control is executed by the feedforward processing unit 56. The circulating current is current that flows through at least one of the primary electric power conversion circuit 20 and the secondary electric power conversion circuit 30 when both the terminal voltages V1, V2 of the transformation circuit 40 are 0. The circulating current is current that does not contribute to transfer of electric power, and is, for example, loop current as shown in FIG 1.

The circulating current determination processing unit 58 has the function of determining whether the value of circulating current flowing through the primary electric power conversion circuit 20 or the secondary electric power conversion circuit 30 is larger than or equal to 0. Here, the value of circulating current is a current value flowing through the primary coil 41 when both the terminal voltages V1, V2 are 0.

Figure 2:
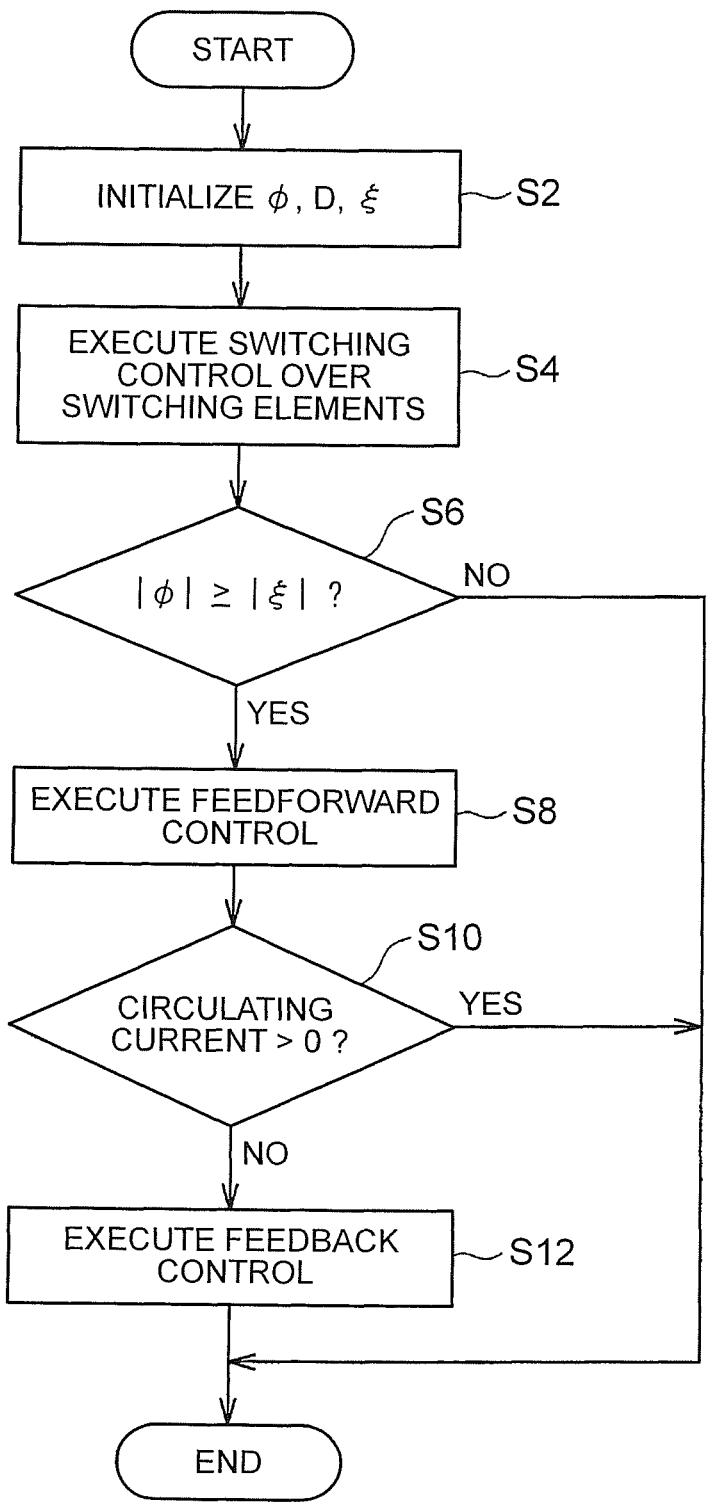
FIG. 2 is a flowchart that shows the procedure for suppressing circulating current according to the embodiment of the invention.

The operation of the thus configured electric power conversion system 8 will be described. FIG. 2 is a flowchart that shows the procedure for suppressing circulating current in the electric power conversion system 8. The phase difference $\phi$ in switching control over the transistors between the primary electric power conversion circuit 20 and the secondary electric power conversion circuit 30 and the on/off ratios D1, D2 of the transistors of the primary electric power conversion circuit 20 and secondary electric power conversion circuit 30 are obtained and set on the basis of external signals, and additionally the dead time converted value $\xi$ is initialized (S2). This process is executed by the functions of the dead time setting processing unit 51, phase difference setting processing unit 52 and on/off ratio setting processing unit 53 of the control circuit 50.

Subsequently, the transistors of the primary electric power conversion circuit 20 and secondary electric power conversion circuit 30 undergo switching control (S4). This process is executed by the functions of the primary switching processing unit 54 and secondary switching processing unit 55 of the control circuit 50.

Subsequently, it is determined whether |phase difference $\phi$|≥|dead time converted value $\xi$| (S6). This process is executed by the function of the feedforward processing unit 56 of the control circuit 50. When it is determined in the process of S6 that the relationship |phase difference $\phi$|≥|dead time converted value $\xi$| is not satisfied, the process proceeds to END processing. When it is determined in the process of S6 that |phase difference $\phi$|≥|dead time converted value $\xi$|, feedforward control is executed such that the on/off ratio of each of the transistors of the power transmitting one of the primary electric power conversion circuit 20 and the secondary electric power conversion circuit 30 is smaller than the on/off ratio of each of the transistors of the power receiving one of the primary electric power conversion circuit 20 and the secondary electric power conversion circuit 30 (S8). This process is executed by the function of the feedforward processing unit 56 of the control circuit 50.

Subsequently, it is determined whether the value of circulating current is larger than or equal to 0 (S10). This process is executed by the function of the circulating current determination processing unit 58 of the control circuit 50. When it is determined in the process of S10 that the value of circulating current is not larger than or equal to 0, the process proceeds to END processing. When it is determined in the process of S10 that the value of circulating current is larger than or equal to 0, feedback control is executed such that the circulating current is 0 (S12). This process is executed by the function of the feedback processing unit 57 of the control circuit 50.

Figure 3:
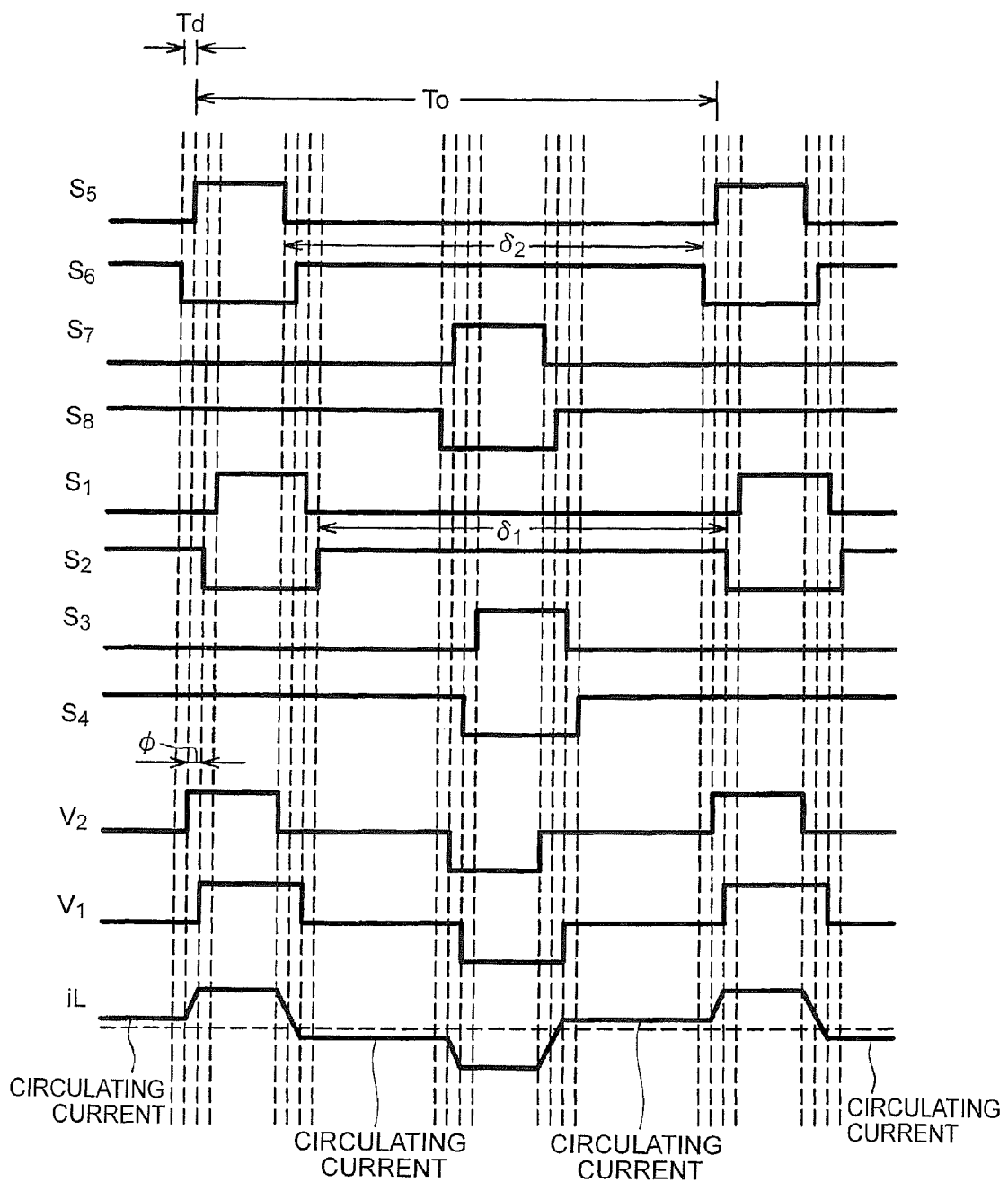
FIG. 3 is a timing chart that shows the correlation among switching control over transistors, terminal voltages V1, V2 of a transformation circuit and $I_L$ that flows through a primary coil in the electric power conversion system when feedforward control and feedback control are not executed according to the embodiment of the invention.

For comparison, the case where the above-described feedforward control and feedback control are not executed in the electric power conversion system 8 is assumed and will be considered. FIG. 3 is a time chart that shows the correlation among switching control over the transistors of the electric power conversion system 8, the terminal voltages V1, V2 of the transformation circuit 40 and $I_L$ that flows through the primary coil 41 when feedforward control and feedback control are not executed. When the dead time Td has been set, there occur fluctuations in phase symmetry between the terminal voltage V1 of the primary coil 41 and the terminal voltage V2 of the secondary coil 42. Thus, there occurs circulating current that does not contribute to transfer of electric power in the primary electric power conversion circuit 20 or the secondary electric power conversion circuit 30. Specifically, as shown in FIG. 3, circulating current at the time when both V1 and V2 are 0 V flows. Suppressing the circulating current is the challenge to be solved by the invention.

Figure 4:
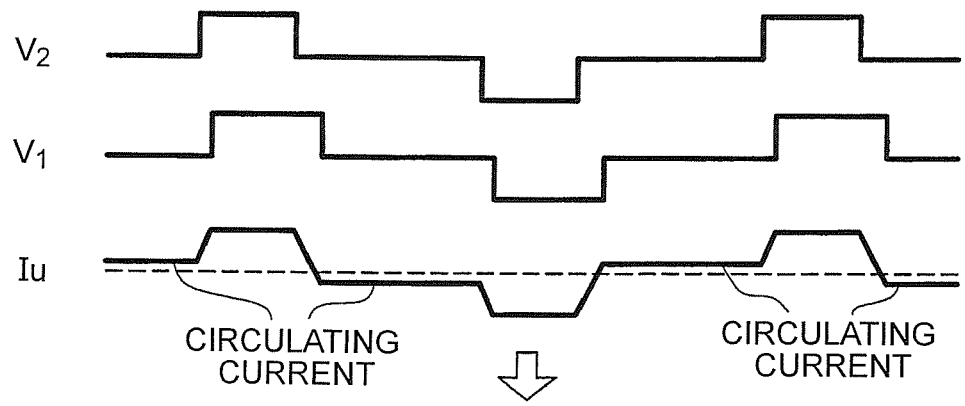
FIG. 4 is a view that shows a state where circulating current is suppressed through feedforward control according to the embodiment of the invention.
Figure 4:
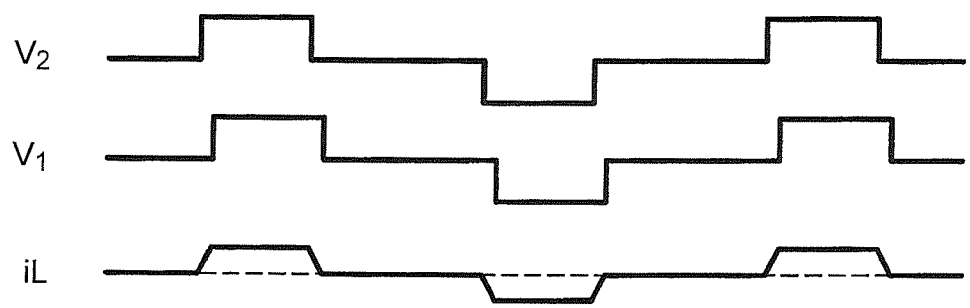

With the electric power conversion system 8 according to the present embodiment, feedforward control is executed such that the on/off ratio of each of the transistors of the power transmitting one of the primary electric power conversion circuit 20 and the secondary electric power conversion circuit 30 is smaller than the on/off ratio of each of the transistors of the power receiving one of the primary electric power conversion circuit 20 and the secondary electric power conversion circuit 30. Thus, circulating current that has flowed in the case where no feedforward control is executed as shown in FIG. 4 is suppressed by making a correction through feedforward control such that the phases of V1 and V2 are symmetric.

With the electric power conversion system 8, when the value of circulating current remains larger than or equal to 0 even when the above-described feedforward control is executed, feedback control for resetting the on/off ratio of each of the transistors of the power transmitting conversion circuit is executed such that the circulating current is 0. Thus, it is possible to further effectively suppress circulating current.

Figure 5:
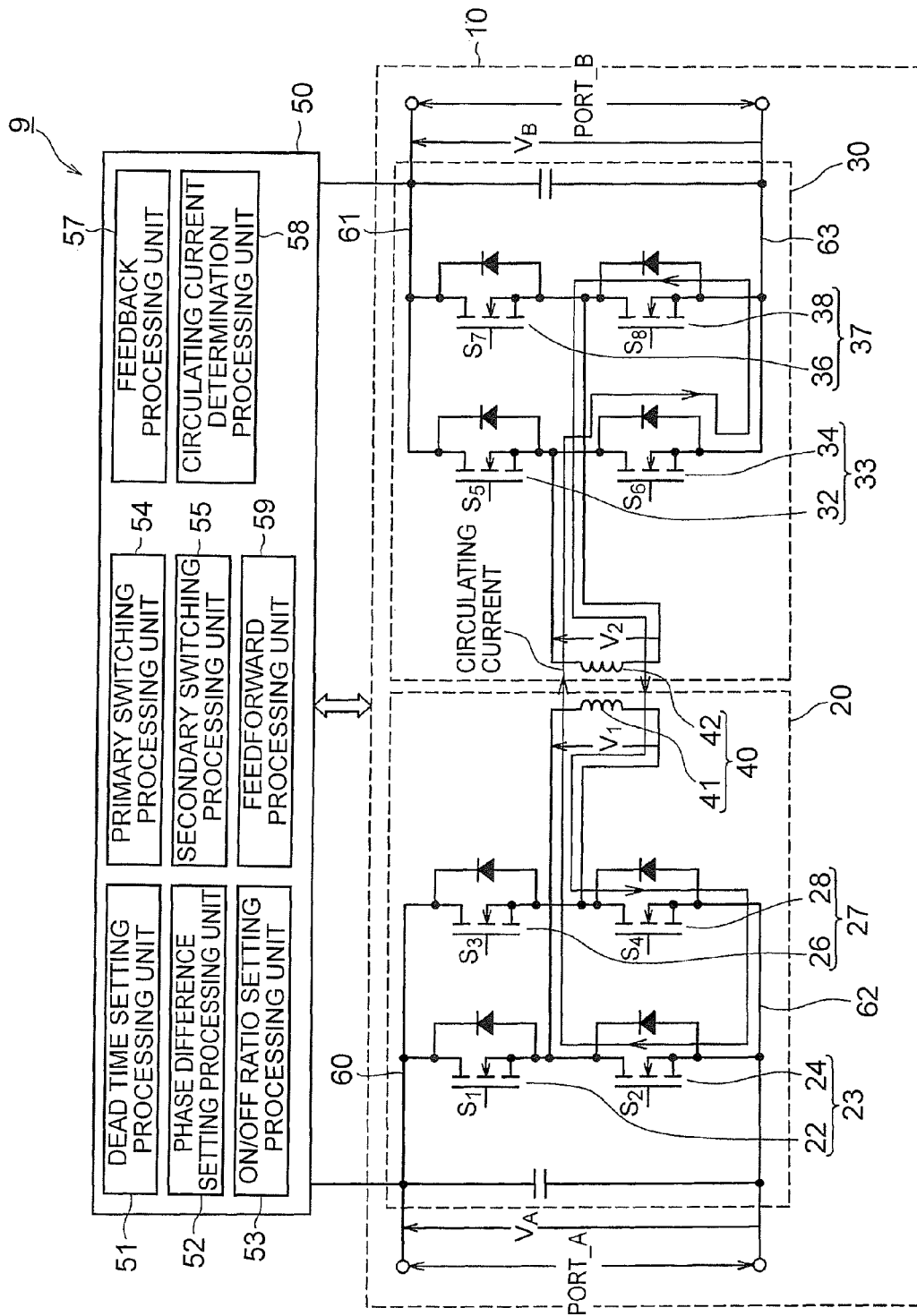
FIG. 5 is a view that shows an electric power conversion system according to an alternative embodiment of the invention.

Next, an electric power conversion system 9 according to an alternative embodiment of the electric power conversion system 8 will be described. FIG. 5 is a view that shows the electric power conversion system 9. The difference between the electric power conversion system 9 and the electric power conversion system 8 is only a feedforward processing unit 59, so the difference will be specifically described below.

The feedforward processing unit 59 executes feedforward control for setting one of the on/off ratio of the terminal voltage V1 of the primary coil 41 and the terminal voltage V2 of the secondary coil 42 in response to fluctuations in phase symmetry between both waveforms when the waveform of the terminal voltage V1 of the primary coil 41 and the waveform of the terminal voltage V2 of the secondary coil 42 are different from each other due to fluctuations in loads connected to the input/output ports A, B. Electric power is transferred between the primary electric power conversion circuit 20 and the secondary electric power conversion circuit 30 when |phase difference $\phi$|≥|dead time converted value $\xi$|, and the feedforward processing unit 59 executes feedforward control for adjusting the on/off ratio of each of the transistors of the primary electric power conversion circuit 20 and secondary electric power conversion circuit 30 such that the value of circulating current that circulates between the primary electric power conversion circuit 20 and the secondary electric power conversion circuit 30 is 0. Specifically, for example, when electric power is transferred from the secondary electric power conversion circuit 30 to the primary electric power conversion circuit 20, the secondary electric power conversion circuit 30 is the power transmitting one, and the primary electric power conversion circuit 20 is the power receiving one. By using the relational expression D2+ΔD, the on/off ratio D2 of each of the transistors 32, 34, 36, 38 of the secondary electric power conversion circuit 30 is reset. ΔD is obtained by using the relational expression ΔD=(1−D2)×(1−NV$_A$/V$_B$). When the primary electric power conversion circuit 20 is the power transmitting one and the secondary electric power conversion circuit 30 is the power receiving one, ΔD is obtained by using the relational expression ΔD=(1−D2)×(1−V$_B$/NV$_A$). The feedforward processing unit 59 does not execute the feedforward control when |phase difference $\phi$|<|dead time converted value $\xi$|.

Figure 6:
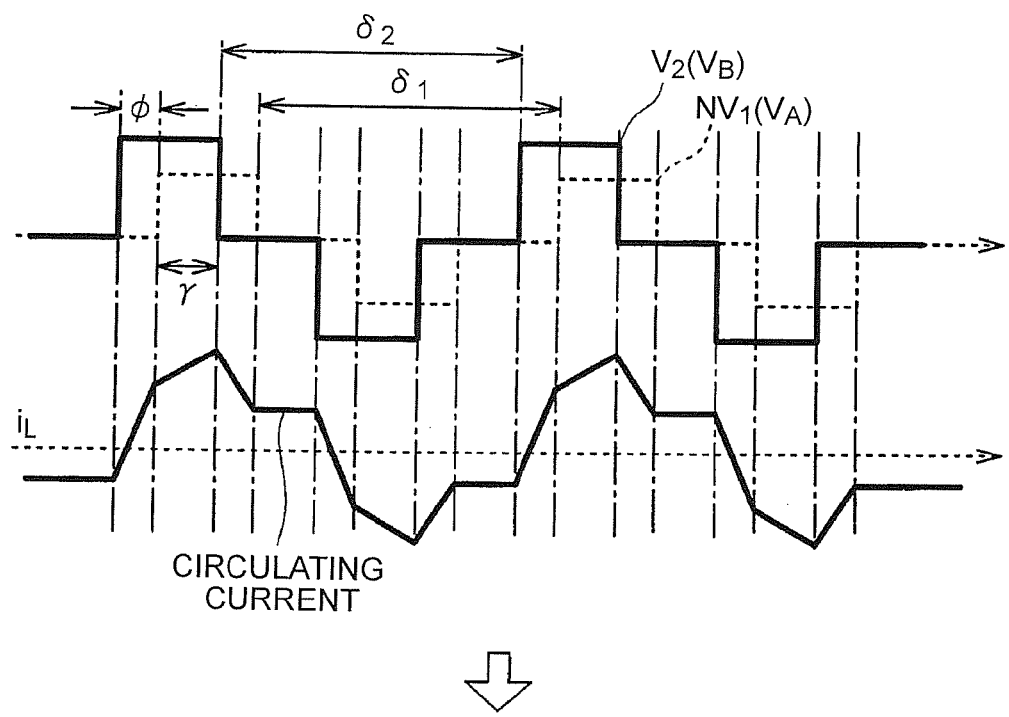
FIG. 6 is a view that shows a state where circulating current is suppressed through feedforward control according to the alternative embodiment of the invention.
Figure 6:
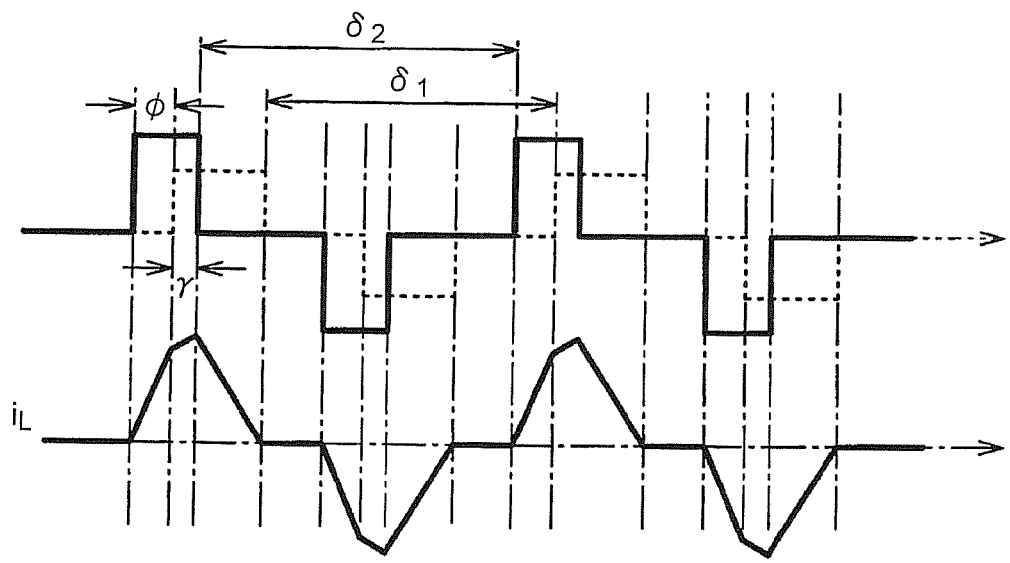
Figure 7:
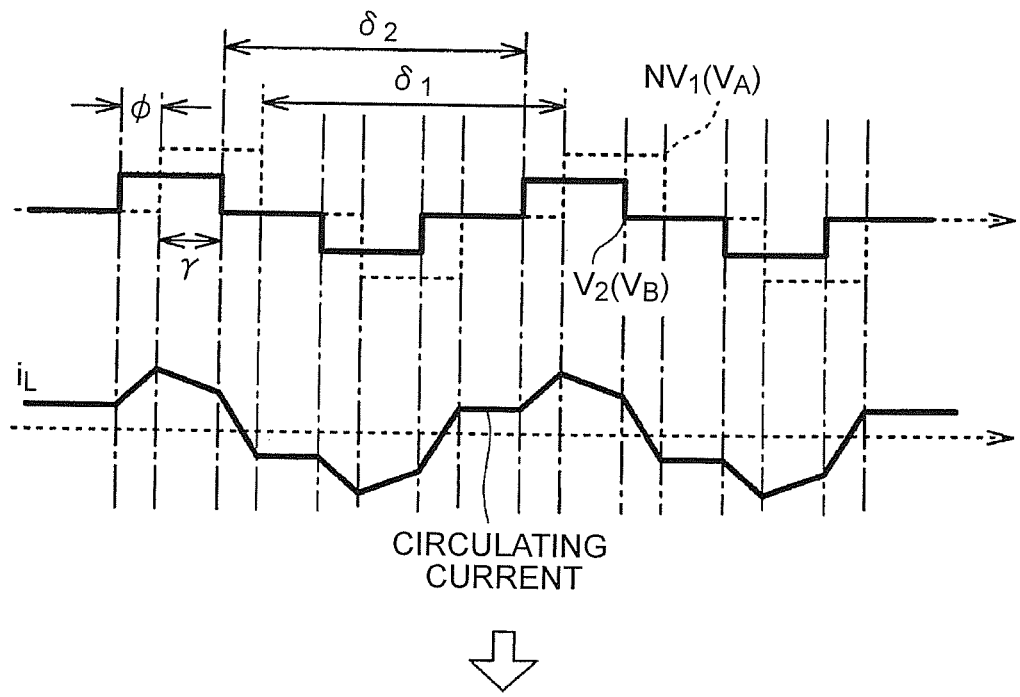
FIG. 7 is a view that shows a state where circulating current is suppressed through feedforward control according to the alternative embodiment of the invention.
Figure 7:
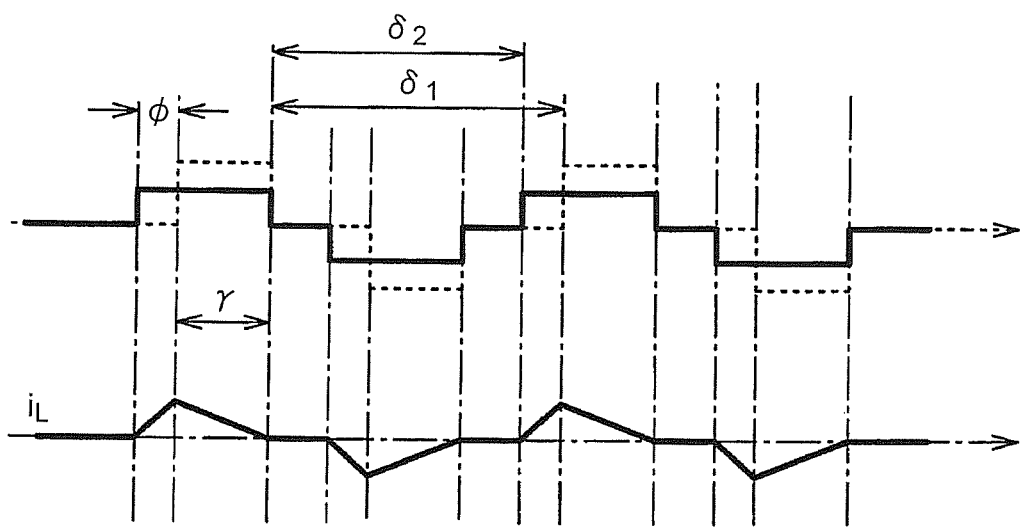

The operation of the thus configured electric power conversion system 9 will be described. In the electric power conversion system 9 as well, the circulating current suppressing program shown in FIG. 2 is executed as in the case of the electric power conversion system 8. With the electric power conversion system 9 according to the present embodiment, feedforward control for adjusting the on/off ratio of each of the transistors of the primary electric power conversion circuit 20 and secondary electric power conversion circuit 30 is executed such that the value of circulating current that circulates between the primary electric power conversion circuit 20 and the secondary electric power conversion circuit 30 is 0. Thus, as shown in FIG. 6, circulating current that has flowed in the case where no feedforward control is executed in a state of NV$_A$<V$_B$ is suppressed by correcting the correlation in voltage ratio between V1 and V2 through feedforward control. As shown in FIG. 7, circulating current that has flowed in the case where no feedforward control is executed in a state of NV$_A$>V$_B$ is suppressed by correcting the correlation in voltage ratio between V1 and V2 through feedforward control.

In the electric power conversion system according to an aspect of the invention, the plurality of transistors may include: a left arm in which a left arm upper transistor and a left arm lower transistor are connected in series with each other at a left arm connection point between the positive electrode bus and the negative electrode bus; and a right arm in which a right arm upper transistor and a right arm lower transistor are connected in series with each other at a right arm connection point between the positive electrode bus and the negative electrode bus, and each of the primary coil and the secondary coil may be connected and arranged between the corresponding left arm connection point and the corresponding right arm connection point.

In the electric power conversion system according to the aspect of the invention, there may be a phase difference $\phi$ between the terminal voltage waveform of the primary coil and the terminal voltage waveform of the secondary coil, a dead time converted value $\xi$ may be determined on the basis of a dead time set in order to prevent a short circuit of at least one of the left arm and the right arm, and feedforward control may not be executed when the phase difference $\phi$ is smaller than the dead time converted value $\xi$; whereas feedforward control may be executed when the phase difference $\phi$ is larger than or equal to the dead time converted value $\xi$.

What is claimed is:

1. An electric power conversion system comprising:
   a primary electric power conversion circuit including a plurality of serially connected primary transistors and a primary coil connected to a primary connection point between the plurality of transistors, between a primary positive electrode bus and a primary negative electrode bus, the plurality of primary transistors include:
      a primary left arm in which a primary left arm upper transistor and a primary left arm lower transistor are connected in series with each other at a primary left arm connection point between the primary positive electrode bus and the primary negative electrode bus; and
      a primary right arm in which a primary right arm upper transistor and a primary right arm lower transistor are connected in series with each other at a primary right arm connection point between the primary positive electrode bus and the primary negative electrode bus,
      the primary coil is connected and arranged between the primary left arm connection point and the primary right arm connection point;
   a secondary electric power conversion circuit including a plurality of serially connected secondary transistors and a secondary coil connected to a secondary connection point between the plurality of secondary transistors, between a secondary positive electrode bus and a secondary negative electrode bus, the plurality of secondary transistors include:
      a secondary left arm in which a secondary left arm upper transistor and a secondary left arm lower transistor are connected in series with each other at a secondary left arm connection point between the secondary positive electrode bus and the secondary negative electrode bus; and a secondary right arm in which a secondary right arm upper transistor and a secondary right arm lower transistor are connected in series with each other at a secondary right arm connection point between the secondary positive electrode bus and the secondary negative electrode bus, the secondary coil is connected and arranged between the secondary left arm connection point and the secondary right arm connection point; and a control circuit configured to control transfer of electric power between the primary electric power conversion circuit and the secondary electric power conversion circuit by magnetically coupling the primary coil to the secondary coil, the control circuit is configured to execute feedforward control for setting one of an on/off ratio of a terminal voltage signal of the primary coil and an on/off ratio of a terminal voltage signal of the secondary coil so that circulating current is zero or suppressed, the circulating current flowing through at least one of the primary electric power conversion circuit and the secondary electric power conversion circuit when both terminal voltage of the primary coil and terminal voltage of the secondary coil are zero, in response to at least one of fluctuations in voltage ratio between a terminal voltage waveform of the primary coil and a terminal voltage waveform of the secondary coil and fluctuations in phase symmetry between the terminal voltage waveform of the primary coil and the terminal voltage waveform of the secondary coil, when the terminal voltage waveform of the primary coil and the terminal voltage waveform of the secondary coil are different from each other, wherein there is a phase difference between the terminal voltage waveform of the primary coil and the terminal voltage waveform of the secondary coil, a dead time converted value is determined on the basis of a dead time set in order to prevent a short circuit of at least one of the primary left arm, the secondary left arm, the primary right arm and the secondary right arm, and feedforward control is not executed when the phase difference is smaller than the dead time converted value; whereas feedforward control is executed when the phase difference is larger than or equal to the dead time converted value.

2. The electric power conversion system according to claim 1, wherein the control circuit is configured to execute feedforward control such that the on/off ratio of each one of the transistors of a power transmitting one of the primary electric power conversion circuit and the secondary electric power conversion circuit is smaller than the on/off ratio of each one of the transistors of a power receiving other of the primary electric power conversion circuit and the secondary electric power conversion circuit.

3. The electric power conversion system according to claim 1, wherein a voltage between the primary positive electrode bus and the primary negative electrode bus is $V_A$, a voltage between the secondary positive electrode bus and a secondary negative electrode bus is $V_B$, a winding number ratio between the primary coil and the secondary coil is 1:N;

the on/off ratio in a switching control over each of the secondary left arm lower transistor and the secondary right arm lower transistor is set to D2, wherein when electric power is transferred from the secondary electric power conversion circuit to the primary electric power conversion circuit, the secondary electric power conversion circuit is a power transmitting electric power conversion circuit and the primary electric power conversion circuit is a power receiving electric power conversion circuit, wherein the on/off ratio D2 of each of the secondary left arm upper transistor, the secondary left arm lower transistor, the secondary right arm upper transistor, and the secondary right arm lower transistor is reset using D2 +ΔD, wherein $\Delta D = (1-D2) \cdot (1 - N \cdot V_A / N_B)$.

4. An electric power conversion system comprising:

a primary electric power conversion circuit including a plurality of serially connected primary transistors and a primary coil connected to a primary connection point between the plurality of transistors, between a primary positive electrode bus and a primary negative electrode bus, the plurality of primary transistors include a primary left arm and a primary right arm, in the primary left arm a primary left arm upper transistor and a primary left arm lower transistor are connected in series with each other at a primary left arm connection point between the primary positive electrode bus and the primary negative electrode bus, in the primary right arm a primary right arm upper transistor and a primary right arm lower transistor are connected in series with each other at a primary right arm connection point between the primary positive electrode bus and the primary negative electrode bus, the primary coil is connected and arranged between the primary left arm connection portion and the primary right arm connection point;

a secondary electric power conversion circuit including a plurality of serially connected secondary transistors and a secondary coil connected to a secondary connection point between the plurality of secondary transistors, between a secondary positive electrode bus and a secondary negative electrode bus, the plurality of secondary transistors include a secondary left arm and a secondary right arm, in the secondary left arm a secondary left arm upper transistor and a secondary left arm lower transistor are connected in series with each other at a secondary left arm connection point between the secondary positive electrode bus and the secondary negative electrode bus, in the secondary right arm a secondary right arm upper transistor and a secondary right arm lower transistor are connected in series with each other at a secondary right arm connection point between the secondary positive electrode bus and the secondary negative electrode bus, the secondary coil is connected and arranged between the secondary left arm connection point and the secondary right arm connection point; and a control circuit configured to control transfer of electric power between the primary electric power conversion circuit and the secondary electric power conversion circuit by magnetically coupling the primary coil to the secondary coil, wherein the control circuit is configured to execute feedforward control for setting one of an on/off ratio of a terminal voltage signal of the primary coil and an on/off ratio of a terminal voltage signal of the secondary coil, in response to at least one of fluctuations in voltage ratio between a terminal voltage waveform of the primary coil and a terminal voltage waveform of the secondary coil and fluctuations in phase symmetry between the terminal voltage waveform of the primary coil and the terminal voltage waveform of the secondary coil, when the terminal voltage waveform of the primary coil and the terminal voltage waveform of the secondary coil are different from each other, wherein there is a phase difference between the terminal voltage waveform of the primary coil and the terminal voltage waveform of the secondary coil, a dead time converted value is determined on the basis of a dead time set in order to prevent a short circuit of at least one of the left arm and the right arm, and feedforward control is not executed when the phase difference is smaller than the dead time converted value; whereas feedforward control is executed when the phase difference is larger than or equal to the dead time converted value.

5. The electric power conversion system according to claim 4, wherein the control circuit is configured to execute feedforward control such that the on/off ratio of each one of the transistors of a power transmitting one of the primary electric power conversion circuit and the secondary electric power conversion circuit is smaller than the on/off ratio of each one of the transistors of a power receiving other of the primary electric power conversion circuit and the secondary electric power conversion circuit.

6. The electric power conversion system according to claim 4, wherein a voltage between the primary positive electrode bus and the primary negative electrode bus is $V_A$, a voltage between the secondary positive electrode bus and a secondary negative electrode bus is $V_B$, a winding number ratio between the primary coil and the secondary coil is 1:N;

the on/off ratio in a switching control over each of the secondary left arm lower transistor and the secondary right arm lower transistor is set to D2, wherein when electric power is transferred from the secondary electric power conversion circuit to the primary electric power conversion circuit, the secondary electric power conversion circuit is a power transmitting electric power conversion circuit and the primary electric power conversion circuit is a power receiving electric power conversion circuit, wherein the on/off ratio D2 of each of the secondary left arm upper transistor, the secondary left arm lower transistor, the secondary right arm upper transistor, and the secondary right arm lower transistor is reset using D2+ΔD, wherein $\Delta D = (1-D2) \cdot (1 - N \cdot V_A / V_B)$.

* * * * *